United States Patent Office 3,451,982
Patented June 24, 1969

3,451,982
TERPOLYMERS OF ETHYLENE, A VINYL ESTER AND AN UNSATURATED AMIDE
George A. Mortimer, La Marque, Tex., assignor to Monsanto Company, St. Louis, Mo., a corporation of Delaware
No Drawing. Filed Aug. 4, 1965, Ser. No. 477,306
Int. Cl. C08f 15/40
U.S. Cl. 260—80.73                    6 Claims

ABSTRACT OF THE DISCLOSURE

Substantially random addition terpolymers of ethylene, a vinyl ester and an unsaturated amide prepared by polymerizing the monomers at elevated temperatures and pressures in the presence of a free-radical-generating catalyst.

---

The present invention relates to new polymeric compositions and, more particularly, to interpolymers of ethylene with vinyl esters and polymerizable unsubstituted and substituted acrylamides and methacrylamides and to a method for their preparation.

High-molecular-weight solid polymers of ethylene are well known in the art. These polymers have a wide range of physical characteristics and chemical properties which make them useful for many purposes. They can be produced by subjecting ethylene to polymerization at elevated pressures from 5,000 to 60,000 p.s.i.g. and elevated temperatures from 100° to 400° C. in the presence of free-radical initiators for the polymerization reaction. The properties of the polymers can be "tailored," so to speak, to a degree by varying polymerization conditions, using different initiators, etc. Variation in polymer properties such as density, molecular weight, melt index, tensile strength, stiffness and surface appearance can also be obtained by the use of compounds known as "modifiers" in the polymerization reaction and/or by polymerizing the ethylene with small amounts of comonomers. It has been proposed heretofore, for example, to polymerize ethylene in admixture with vinyl esters such as vinyl acetate, for example, to produce polymeric products which are tougher than polyethylene and from which thin blown films can be made which have less haze than do thin films of polyethylene. While the resulting copolymers are satisfactory for some purposes, they are inadequate for others because of their lack of the requisite toughness and stiffness. It has now been discovered that the addition of certain unsubstituted or substituted acrylamides and methacrylamides as a third component in ethylene-vinyl ester polymer compositions results in a polymeric product which is tougher than ethylene-ester copolymers. Thick specimens of the ethylene-ester-acrylamide terpolymers have a transparency substantially equivalent to polyethylene films whereas specimens of polyethylene and ethylene-ester copolymers of comparable thickness are opaque. The terpolymers are also stiffer than the prior art copolymers when a sufficient amount of the amide component is present. Particularly noteworthy is the enhanced stiffness since ordinarily only small amounts of the vinyl esters can be polymerized with ethylene to obtain the desired modified properties in the resulting polymer. Use of amounts outside the rather narrow ranges disclosed as suitable adversely affects the rigidity of the polymers leading to rubberlike materials.

It is, accordingly, an object of the present invention to provide novel, solid interpolymers of ethylene characterized by a high degree of toughness and yet possessing a stiffness either equivalent to or superior to that of polyethylene and prior art copolymers. Another object of the invention is to provide stiff, tough interpolymers of ethylene which are characterized by high transparency and are eminently suitable for use in the production of bottles, films and molded objects.

These and other objects and advantages of the invention which will become apparent from the following description thereof are accomplished by interpolymerizing ethylene, a vinyl ester of a saturated monocarboxylic acid containing up to 20 carbon atoms, and an amide of the formula

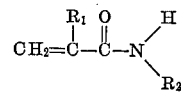

wherein $R_1$ may be hydrogen or a methyl radical and $R_2$ may be hydrogen or an alkyl, hydroxyalkyl or aryl radical having up to 8 carbon atoms.

As examples of the vinyl esters which can be interpolymerized with ethylene and the defined amide compound to produce the novel and improved interpolymers of the invention, there may be mentioned vinyl formate, vinyl acetate, vinyl propionate, vinyl butyrate, vinyl laurate, vinyl stearate, vinyl crotonate, vinyl linoleate, vinyl pivalate, vinyl trifluoroacetate, and the like.

Specific examples of the amides useful as the third monomer for producing the interpolymers of the invention include acrylamide, N-methylacrylamide, N-ethylacrylamide, N-propylacrylamide, N-isopropylacrylamide, N-tert-butylacrylamide, N-amylacrylamide, N-tert-octylacrylamide, N-decylacrylamide, N-hydroxymethylacrylamide, N-hydroxyethylacrylamide, N-hydroxypropylacrylamide, N-phenylacrylamide, N-o-tolylacrylamide, N-p-tolylacrylamide, N-naphthylacrylamide, and the like as well as methacrylamide and all of the corresponding substituted methacrylamides.

In general, the interpolymers of the invention should contain at least 50 mole percent ethylene. Usually, amounts of ethylene from about 60 to about 98.5% are employed with amounts from about 80 to about 98 mole percent being preferred. The vinyl ester is present in amounts from about 1 to about 20 mole percent with amounts in the range from 1 to 10 mole percent being preferred. The amount of the unsaturated amide which constitutes the third component of the novel interpolymers of the invention may vary from about 0.5 to about 20 mole percent but preferably the quantity of the amide comonomer is from about 1 to about 10 mole percent.

The polymerization process by which the interpolymers are produced is conducted at superatmospheric pressures from about 5,000 p.s.i.g. up to as high as 60,000 p.s.i.g. Preferably, the pressures employed are in the range from about 20,000 to about 35,000 p.s.i.g.

While the temperature of the polymerization process may be varied over the range from about 100° to about 400° C., preferred temperatures are those from about 130° to about 300° C.

Any of the well known free-radical initiators used for catalyzing the polymerization of ethylene can be employed for producing the novel interpolymers herein described. Among these may be mentioned molecular oxygen; per-oxygen type compounds such as hydrogen peroxide, dialkyl dioxides such as diethyl peroxide and di-tert-butyl peroxide, diacyl peroxides such as lauroyl peroxide and benzoyl peroxide, alkyl hydroperoxides such as tert-butyl hydroperoxide, diperoxy dicarbonate esters such as diisopropylperoxy dicarbonate, tert-alkyl percarboxylates such as tert-butylperbenzoate, persulfates such as potassium persulfate, peracids such as peracetic acid and the like; azo-type compounds such as azo-bis-isobutyronitrile; azines such as benzalazine; oximes such as acetone oxime; etc. Particularly suitable are peroxides such as di-tert-butyl peroxide, for example. Only small amounts of the initiator are required. Generally, initiator concentration will vary from about 0.0005% to about 2% of the total weight of the monomers charged to the polymerization reactor.

So-called polymerization "modifiers" or chain-transfer agents can also be employed in the manufacture of the interpolymers of the invention, if desired, to obtain certain polymer properties which such modifiers or chain-transfer agents may impart. Examples of compounds in general used in the art for this purpose are aliphatic alcohols containing one to ten carbon atoms and preferably three to five carbon atoms such as methanol, propanol, isobutanol, hexanol and decanol; aliphatic saturated ketones containing three to ten carbon atoms and preferably three to five carbon atoms such as acetone, diethyl ketone, methyl isopropyl ketone and the like; saturated aliphatic aldehydes containing one to eight carbon atoms and preferably two to five carbon atoms such as formaldehyde, acetaldehyde, butyraldehyde and the like; saturated hydrocarbons such as ethane, propane, cyclohexane and the like; aromatic hydrocarbons such as toluene, xylene and the like; chlorinated hydrocarbons such as chloroform, carbon tetrachloride and the like; and hydrogen.

The polymerization process may be either a batch or a continuous one. The preferred method is the continuous type of operation wherein ethylene, the vinyl ester comonomer, the amide comonomer, initiator, and modifier, if one is used, are charged to a reactor maintained under suitable conditions of temperature and pressure, interpolymer is continuously separated from the reactor effluent, and unreacted monomers, initiator, and modifier, if any, are recycled to the reactor.

The invention is illustrated in the following example which, however, is not to be construed as limiting it in any manner whatsoever. All percentages given therein are on a molar basis unless otherwise indicated, except conversion which is given in weight percent.

EXAMPLE

A series of experiments were conducted in which ethylene was interpolymerized with various vinyl esters and both unsubstituted and substituted acrylamides. In each experiment, a steel reaction bomb together with all accessory lines thereto was carefully cleaned and flushed with ethylene to eliminate all traces of air or oxygen. The normally gaseous feed materials, i.e., ethylene and propane which was used as a modifier, were introduced into the reaction chamber of the bomb heated to the reaction temperature of 130° C. at atmospheric pressure until the pressure increased to about 700 p.s.i. Thereafter, additional hot ethylene was pumped into the bomb until the pressure reached about 7500 p.s.i. at the temperature level of 130° C. Then the mechanical agitator inside the bomb was activated and the normally liquid feeds, i.e., the comonomers contained in a solvent vehicle, and di-tert-butyl peroxide initiator dissolved in benzene, were forced from a small cold compartment of the bomb where they had been stored free of air or oxygen contamination into the reaction chamber by means of high pressure ethylene charged until a final pressure of 20,000 p.s.i. at 130° C. was attained. After the desired reaction time, the bomb was depressurized and the polymer product was recovered and its physical properties determined.

A summary of the reaction conditions for the various runs made is presented in Table I below and the physical properties determined for the interpolymers produced under these conditions are presented in Table II. The methods used for the determination of melt index and density are described in J. App. Polymer Sci., 8, 839 (1964) and J. Polymer Sci., A–2, 1301 (1964), respectively. All other evaluations were performed on nominally 20-mil thick specimens. A standard procedure, ASTM D–1822 61T, was followed for the tensile impact test using the S specimen. The L specimen of this procedure was used for slow speed testing. It was pulled at 2 in./min. in an Instron tensile testing machine until the sample failed. From the force curve, the modulus (5% secant), tensile at yield, and tensile at fail were calculated based on the dimensions of the unextended specimen. Haze was also determined on 20-mil specimens using Procedure A of ASTM D–1003–61 defining haze as "diffuse luminous transmittance" where a lower value indicates a less hazy, more transparent sample.

Vinyl acetate content of the polymers was calculated from the reactivity ratios reported by Brown and Ham, J. Polymer Sci., 42, 3623 (1964) and Burkhart and Zutty, J. Polymer Sci., 41, 1137 (1963). The content of the other esters and of the amides was determined either by combustion elemental analysis or by scintillation counting if the monomer was $C^{14}$-labeled.

It will be seen from the first four runs in Table II that the incorporation of an acrylic-type amide into an ethylene-vinyl acetate copolymer permits the attainment of properties in the resulting interpolymer unobtainable from copolymerizing ethylene with vinyl acetate as practiced in the prior art. The terpolymers have the stiffness of low-content vinyl acetate copolymers, the impact resistance of higher content vinyl acetate copolymers, and ultimate strength and transparency superior to that of known ethylene-vinyl acetate copolymers. The polymeric products obtained by interpolymerization of different other unsaturated amides with other vinyl esters and ethylene likewise exhibit comparable enhanced properties over the known related copolymers.

TABLE I

| Run No. | Initiator Conc., moles/li. (x10⁻⁴) | $C_2H_4$, percent | Vinyl Ester | Percent | Amide | Percent | $CH_3OH$, percent | Benzene, percent | $C_3H_8$, percent | Reaction time (min.) | Conversion, wt. percent |
|---|---|---|---|---|---|---|---|---|---|---|---|
| 1 | 2.1 | 82.3 | Vinyl acetate | 1.0 | | | | 0.2 | 16.6 | 52 | 9.5 |
| 2 | 2.1 | 82.4 | do | 4.1 | | | | 0.2 | 13.4 | 50 | 8.3 |
| 3 | 4.1 | 84.3 | do | 1.0 | N-isopropylacrylamide | 0.2 | | 1.1 | 13.4 | 28 | 6.1 |
| 4 | 4.1 | 82.4 | do | 1.0 | N-phenylacrylamide | 0.2 | 2.9 | 0.2 | 13.4 | 114 | 12.3 |
| 5 | 4.1 | 84.7 | Vinyl butyrate | 0.7 | | | | 0.2 | 14.4 | 47 | 7.1 |
| 6 | 6.2 | 90.1 | do | 1.7 | | | | 0.2 | 8.0 | 74 | 6.3 |
| 7 | 6.2 | 93.7 | do | 0.7 | N-tert-butylacrylamide | 0.6 | | 0.1 | (¹) | 83 | 7.2 |
| 8 | 2.1 | 82.6 | Vinyl pivalate | 0.6 | | | | 0.2 | 16.6 | 63 | 10.1 |
| 9 | 4.1 | 82.0 | do | 0.6 | N-hydroxymethylacrylamide | 0.1 | (²) | 0.2 | 16.6 | 45 | 5.8 |
| 10 | 2.1 | 83.5 | do | 1.9 | | | | 0.2 | 14.4 | 38 | 8.9 |
| 11 | 6.2 | 82.5 | do | 1.9 | N-isopropylacrylamide | 0.4 | 1.1 | 0.2 | 13.9 | 75 | 9.8 |
| 12 | 4.1 | 92.2 | Vinyl stearate | 0.8 | | | | 1.8 | 5.3 | 50 | 8.3 |
| 13 | 4.1 | 88.6 | do | 0.8 | Acrylamide | 0.3 | 4.8 | 0.2 | 5.3 | 73 | 8.8 |

¹ 4.9% ethanol used as modifier in this run.  ² 0.5% $H_2O$.

TABLE II

| Polymer from Run No.: | Polymer Composition, percent | | | Melt Index (dg./min.) | Modulus, p.s.i. | Density, g./cc. | Tensile at Yield, p.s.i. | Tensile at Fail, p.s.i. | Tensile Impact, p.s.i. | Haze, percent |
|---|---|---|---|---|---|---|---|---|---|---|
| | $C_2H_4$ | Ester | Amide | | | | | | | |
| 1 | 98.8 | 1.2 | | 4.7 | 1,390 | 0.938 | 1,630 | 2,040 | 54 | 72 |
| 2 | 95.3 | 4.7 | | 4.8 | 700 | 0.941 | 960 | 3,120 | 304 | 49 |
| 3 | 96.8 | 1.3 | 1.9 | 3.1 | 1,220 | 0.935 | 1,330 | 4,270 | 310 | 5 |
| 4 | 96.9 | 1.5 | 1.6 | 2.7 | 1,350 | 0.946 | 1,560 | 3,120 | 192 | 46 |
| 5 | 98.9 | 1.1 | | 3.0 | 1,880 | 0.937 | 2,050 | 2,860 | 54 | 71 |
| 6 | 98.1 | 1.9 | | 11.4 | 1,380 | 0.938 | 1,560 | 2,300 | 54 | 71 |
| 7 | 94.1 | 1.3 | 4.6 | 4.1 | [1] 1,930 | 0.933 | 1,640 | 5,370 | 331 | 65 |
| 8 | 99.1 | 0.9 | | 3.2 | 1,530 | 0.932 | 1,760 | 2,920 | 83 | (²) |
| 9 | 97.8 | 1.0 | 1.2 | 0.9 | 1,430 | 0.936 | 1,690 | 2,820 | 95 | 4 |
| 10 | 97.6 | 2.4 | | 1.8 | 910 | 0.930 | 1,130 | 4,220 | 521 | 71 |
| 11 | 92.8 | 3.0 | 4.2 | 1.7 | 1,010 | 0.933 | 1,180 | 5,270 | 344 | 72 |
| 12 | 98.8 | 1.2 | | 0.6 | 1,670 | 0.936 | 1,820 | 1,820 | 130 | 12 |
| 13 | 97.2 | 1.4 | 1.4 | 0.8 | 1,380 | 0.935 | 1,620 | 3,470 | 220 | (²) 72 |

[1] When the modulus exceeds the tensile at yield, the initial portion of the stress-strain curve must be extrapolated to 5% elongation to measure the molulus. [2] Not measured.

The interpolymers of the invention are useful per se in many applications or they may also be blended with other thermoplastic polymers to produce films, moldings, bottles and the like. Fillers, reinforcing agents such as fibrous materials and foaming agents may be added to the interpolymers to render them suitable for particular applications. The properties of the interpolymers can be preserved or enhanced by the addition of stabilizing agents and pigments may be added to the interpolymers to obtain colored compositions.

What is claimed is:

1. Substantially random addition interpolymers consisting essentially of from about 60 to about 98.5 mole percent ethylene, from about 1 to about 20 mole percent of a vinyl ester of a saturated monocarboxylic acid containing up to 20 carbon atoms, and from about 0.5 to about 20 mole percent of an amide of the formula

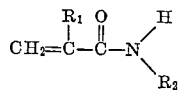

wherein $R_1$ is selected from the group consisting of hydrogen and the methyl radical and $R_2$ is selected from the group consisting of alkyl, hydroxyalkyl and aryl radicals containing up to 8 carbon atoms.

2. Substantially random addition interpolymers consisting essentially of from about 80 to about 98 mole percent ethylene, from about 1 to about 10 mole percent of a vinyl ester of a saturated monocarboxylic acid containing up to 20 carbon atoms, and from about 1 to about 10 mole percent of an amide of the formula

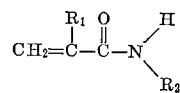

wherein $R_1$ is selected from the group consisting of hydrogen and the methyl radical and $R_2$ is selected from the group consisting of alkyl, hydroxyalkyl and aryl radicals containing up to 8 carbon atoms.

3. The interpolymers of claim 2 wherein said vinyl ester is vinyl acetate.

4. The interpolymers of claim 2 wherein said amide is N-isopropylacrylamide.

5. The interpolymers of claim 3 wherein said amide is N-isopropylacrylamide.

6. The interpolymers of claim 2 wherein said ester is vinyl butyrate and said amide is N-tert-butyl acrylamide.

References Cited

UNITED STATES PATENTS

| 3,405,200 | 10/1968 | Yasumura | 260—897 |
| 2,396,785 | 3/1946 | Hanford | 260—78 |
| 3,232,895 | 2/1966 | Klein et al. | 260—80.73 |
| 2,450,451 | 10/1948 | Schmerling | 260—94.9 |
| 3,380,851 | 4/1968 | Lindemann | 117—140 |

JOSEPH L. SCHOFER, Primary Examiner.

ROGER S. BENJAMIN, Assistant Examiner.

U.S. Cl. X.R.

260—80.81